United States Patent
Li et al.

(10) Patent No.: US 11,543,043 B2
(45) Date of Patent: Jan. 3, 2023

(54) FREE-STANDING FAUCET

(71) Applicant: Globe Union Industrial Corp., Taichung (TW)

(72) Inventors: Chun-Hung Li, Taichung (TW); Yung-Cheng Yu, Taichung (TW); Jiun-Li Tsai, Taichung (TW); Chu-Cheng Chu, Taichung (TW); Kuo-Tung Ni, Taichung (TW)

(73) Assignee: Globe Union Industrial Corp., Taichung (TW)

(*) Notice: Subject to any disclaimer, the term of this patent is extended or adjusted under 35 U.S.C. 154(b) by 0 days.

(21) Appl. No.: 17/512,818

(22) Filed: Oct. 28, 2021

(65) Prior Publication Data

US 2022/0049784 A1    Feb. 17, 2022

Related U.S. Application Data

(63) Continuation-in-part of application No. 16/689,186, filed on Nov. 20, 2019, now Pat. No. 11,408,154.

(30) Foreign Application Priority Data

Jan. 7, 2019  (CN) .......................... 201920019825.6

(51) Int. Cl.
  *F16K 11/00*    (2006.01)
  *E03C 1/04*     (2006.01)
(52) U.S. Cl.
  CPC .......... *F16K 19/006* (2013.01); *E03C 1/0401* (2013.01); *E03C 1/0403* (2013.01)

(58) Field of Classification Search
CPC .... F16K 19/006; E03C 1/0401; E03C 1/0403; E03C 1/0408; E03C 2201/30
See application file for complete search history.

(56) References Cited

U.S. PATENT DOCUMENTS

| 9,334,633 | B2 | 5/2016 | Harris et al. | |
| D790,666 | S * | 6/2017 | Lord | D23/239 |
| 2007/0186975 | A1* | 8/2007 | Shieh | E03C 1/04 |
| | | | | 137/119.05 |
| 2013/0139920 | A1* | 6/2013 | Wang | E03C 1/057 |
| | | | | 137/801 |
| 2014/0007967 | A1* | 1/2014 | Sun | E03C 1/102 |
| | | | | 137/801 |
| 2019/0145533 | A1* | 5/2019 | Pirutin | F16K 11/087 |
| | | | | 137/896 |

* cited by examiner

*Primary Examiner* — Patrick C Williams
(74) *Attorney, Agent, or Firm* — Karin L. Williams; Alan D. Kamrath; Mayer & Williams PC (57) ABSTRACT

A free-standing faucet which includes a valve assembly, a spout, an inlet tube set, and a free-standing casing tube, a spray holder, and a spray is revealed. The valve assembly consists of a housing, a mixing valve, and a diverter, and a handle. The housing is composed of a mixing valve chamber in which the mixing valve is mounted, a pipe joint connected to the inlet tube set, a connection portion formed on one side of the pipe joint close to the mixing valve chamber, a first cold water channel, and a first hot water channel. The first hot and cold water channels are formed inside the pipe joint and communicating with the connection portion and the inlet tube set. An adapter is connected to the connection portion and having second cold and hot water channels. Thereby the mixing valve can be assembled and positioned easily, securely and accurately.

7 Claims, 9 Drawing Sheets

FREE-STANDING FAUCET

BACKGROUND OF THE INVENTION

Field of the Invention

This application is a Continuation-in-Part of application Ser. No. 16/689,186, filed on Nov. 20, 2019.

Description of Related Art

A typical free-standing faucet is disposed on a floor around a tub for filling water into the tab. Referring to U.S. Pat. No. 9,334,633, a tub filler faucet assembly for coupling to a floor is revealed. The tub filler faucet assembly includes a free-standing spout spaced apart from a tub wall; a valve assembly fluidly coupled to the spout; a free-standing mounting assembly spaced apart from the tub wall and coupled to the spout and a top surface of the floor; and a rough-in assembly positioned below the floor and coupled to the free-standing mounting assembly. The rough-in assembly includes at least one passageway fluidly coupled to the valve assembly.

The rough-in assembly further includes a cold-water inlet tube, a hot-water inlet tube, a base and a cover that conceals the inlet tubes and a portion of the base. At least a part of the rough-in assembly is positioned below the floor while other portions of the rough-in assembly extend above the floor.

The valve assembly which further includes a housing, a handle, a mixing valve and a diverter valve is connected to a spray holder. By a water hose, the valve assembly is connected to a handheld spray head which is detachably mounted to the spray holder. Under normal condition, hot water and cold water flowing respectively from a cold-water inlet tube and a hot-water inlet tube into the rough-in assembly is further delivered to the mixing valve. Then users can operate the handle for control of the mixed water formed by the hot water and the cold water to flow out of the spout. This is the first jet mode. Or the mixed water is switched by the diverter valve to flow into the water hose, through the spray holder, and out of the handheld spray head. This is the second jet mode. Therefore, users can choose the jet types according to their requirements.

Generally, the valve assembly further includes a pipe joint which is mounted in the valve assembly and is not only assembled and connected with the cold-water inlet tube and the hot-water inlet tube from the bottom to the top, but also the mixing valve passed through the housing of the valve assembly from the outside in horizontally. Thereby, cold water and hot water respectively from the cold-water inlet tube and the hot-water inlet tube flow into the mixing valve smoothly. However, cold-water and hot-water inlets and a mixed water outlet on the mixing valve are usually unable to be accurately connected to the corresponding cold-water and hot-water outlets and a connecting hole of the pipe joint due to limitations of the specification/size and structural design-. This causes trouble in the assembly and affects the smoothness of water flow. Moreover, some mixing valves are used in combination with positioning components while being assembled so that most of the assembly of the mixing valves have a complicated structure and problems such as difficulty in assembly, poor firmness, etc, still exist. Thus, there is room for improvement and there is a need to provide a novel design which ensures that the mixing valve can be assembled and connected with the pipe joint easily, firmly and accurately.

SUMMARY OF THE INVENTION

Therefore, it is a primary object of the present invention to provide a free-standing faucet in which a mixing valve inside a valve assembly is able to be assembled and positioned easily, firmly, and accurately for allowing water to communicate and flow smoothly and further meeting the water needs of all users.

In order to achieve the above object, a free-standing faucet according to the present invention is disposed and fixed on a floor and composed of a valve assembly, a spout connected to the valve assembly, an inlet tube set, and a free-standing casing tube, a spray holder, and a spray. The valve assembly consists of a housing, a mixing valve in the housing, a diverter in the housing, and a handle for operation and control of water flow and temperature. The spray holder is connected to and communicating with the housing for allowing water to pass through. The spray is composed of a water hose and a handheld spray head which are respectively connected to and communicating with the spray holder and the water hose. The inlet tube set which includes a cold-water inlet tube and a hot-water inlet tube is disposed in the free-standing casing tube.

The free-standing faucet features on that the housing is provided with a mixing valve chamber in which the mixing valve is mounted, a pipe joint formed horizontally on an inner side of the mixing valve chamber and having a bottom connected to the inlet tube set, a connection portion formed on one side of the pipe joint close to the mixing valve chamber, and a first cold water channel and a first hot water channel which are formed inside the pipe joint and communicating with the inlet tube set and the connection portion.

Moreover, the valve assembly further includes an adapter which is connected to the connection portion inside the housing and provided with a second cold water channel and a second hot water channel which are formed in the adapter for guiding cold water and hot water from the first cold water channel and the first hot water channel to a third cold water channel and a third hot water channel of the mixing valve respectively.

A connection wall surface and a circular limit wall are arranged at the connection portion of the pipe joint of the free-standing faucet and combined with each other to define a mounting slot. The first cold water channel and the first hot water channel of the pipe joint are respectively provided with a first cold water outlet and a first hot water outlet which are located at the connection wall surface. The adapter which is mounted and limited in the mounting slot is further provided with an inner contact wall surface and an outer contact wall surface while the second cold water channel and the second hot water channel are located between the inner contact wall surface and the outer contact wall surface. The inner contact wall surface is attached and connected to the connection wall surface closely so that a second cold water inlet formed on an inner side of the second cold water channel and a second hot water inlet formed on an inner side of the second hot water channel are respectively aligned and communicating with the first cold water outlet and the first hot water outlet. The outer contact wall surface is attached and connected to an inner wall surface of the mixing valve closely so that a second cold water outlet formed on an outer side of the second cold water channel and a second hot water outlet formed on an outer side of the second hot water channel are aligned and communicating with a third cold water inlet formed on the third cold water channel and a third hot water inlet formed on the third hot water channel respectively.

As to the pipe joint of the free-standing faucet, a threaded hole is formed on the connection wall surface thereof while the adapter is provided with a connection area at which a through hole is arranged. A fastening bolt is inserted through the through hole and then engaged with the threaded hole so as to fix the adapter to the pipe joint.

A notch is formed on a lower part of the outer contact wall surface of the free-standing faucet while the connection area is a thin plate disposed on an inner side of the notch.

In the adapter of the free-standing faucet, both the second cold water channel and the second hot water channel are composed of an inner side hole and an outer side hole communicating and connected with each other in a staggered manner. The two inner side holes are provided with the second cold water inlet and the second hot water inlet respectively while the two outer side holes are provided with the second cold water outlet and the second hot water outlet respectively.

A mixed water channel disposed on the mixing valve of the free-standing faucet for allowing the mixed water formed by mixing of cold and hot water coming respectively from the third cold water channel and the third hot water channel in a certain ratio to flow out. A mixed water outlet is formed on the mixed water channel, located at a lower part of the mixing valve, and communicating with the notch of the adapter. The adapter is further provided with a circular groove which is communicating with the notch and having a horizontal slot on an upper part thereof while a circulation opening aligned with the horizontal slot is formed on the connection wall surface of the pipe joint so that the horizontal slot is communicating with the diverter.

In the mixing valve of the free-standing faucet, two positioning pins are projecting from the inner wall surface of the mixing valve and the outer contact wall surface of the adapter is provided with two positioning holes corresponding to the positioning pins for mounting and positioning the positioning pins therein.

The inner contact wall surface of the adapter of the free-standing faucet is provided with two positioning circular slots arranged around the second cold water inlet and the second hot water inlet respectively while a sealing gasket is mounted in each of the positioning circular slots and leaning against the connection wall surface of the pipe joint.

In the present free-standing faucet, the mixing valve and the pipe joint are connected easily, securely and accurately due to the delicate design of the adapter, and smooth water flow is also ensured.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

The features and advantages of the present invention will become apparent from the following detailed description of embodiments with reference to the figures.

Figure 1:
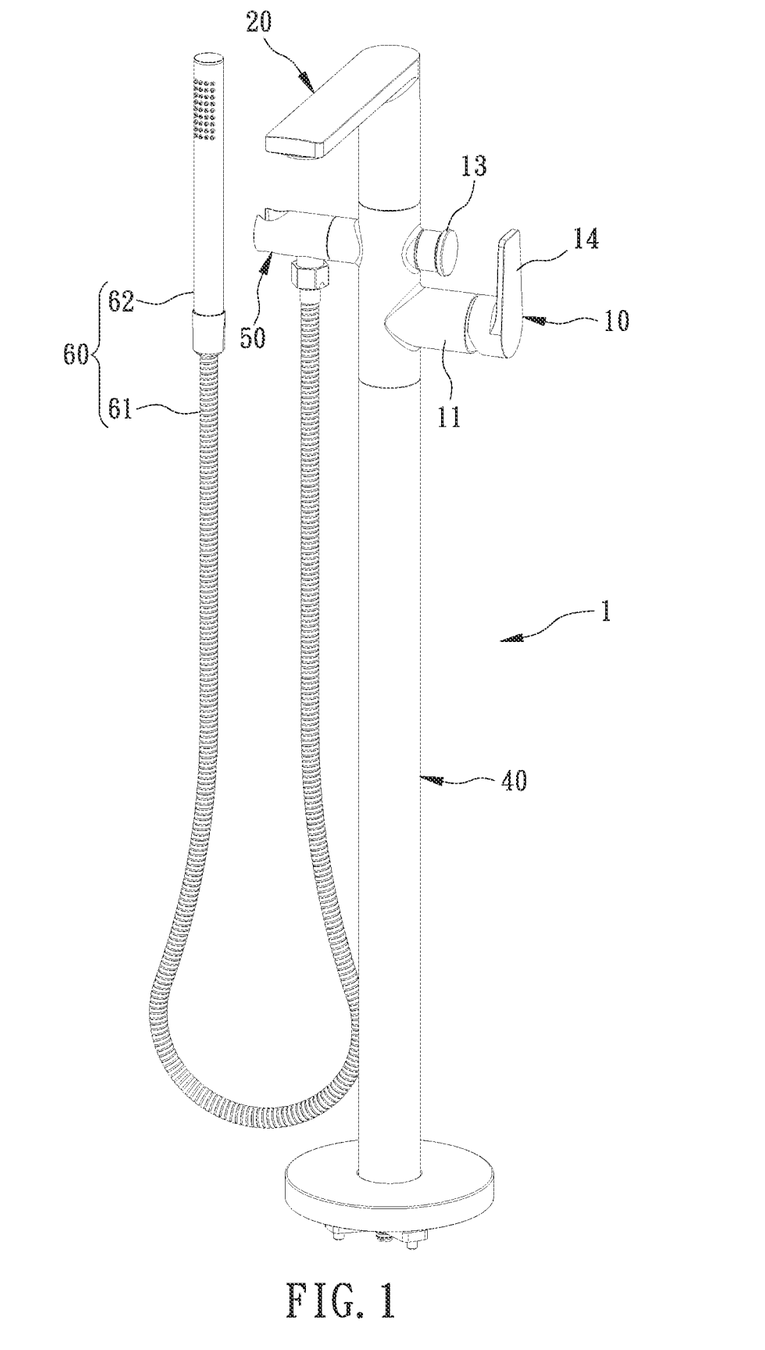
FIG. 1 is a perspective view of an embodiment of a free-standing faucet according to the present invention.
Figure 2:
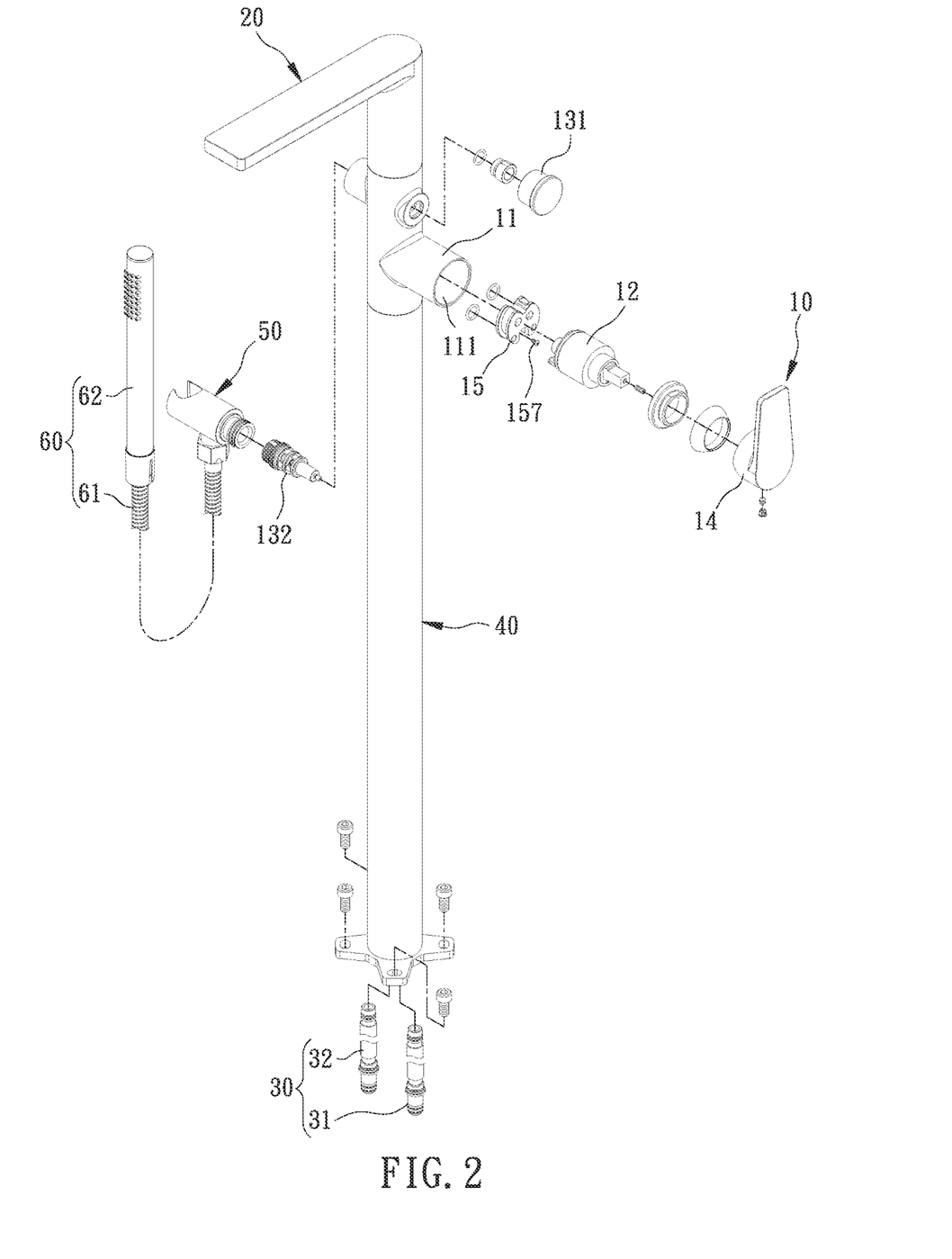
FIG. 2 is a partial exploded view of an embodiment of a free-standing faucet according to the present invention.
Figure 3:
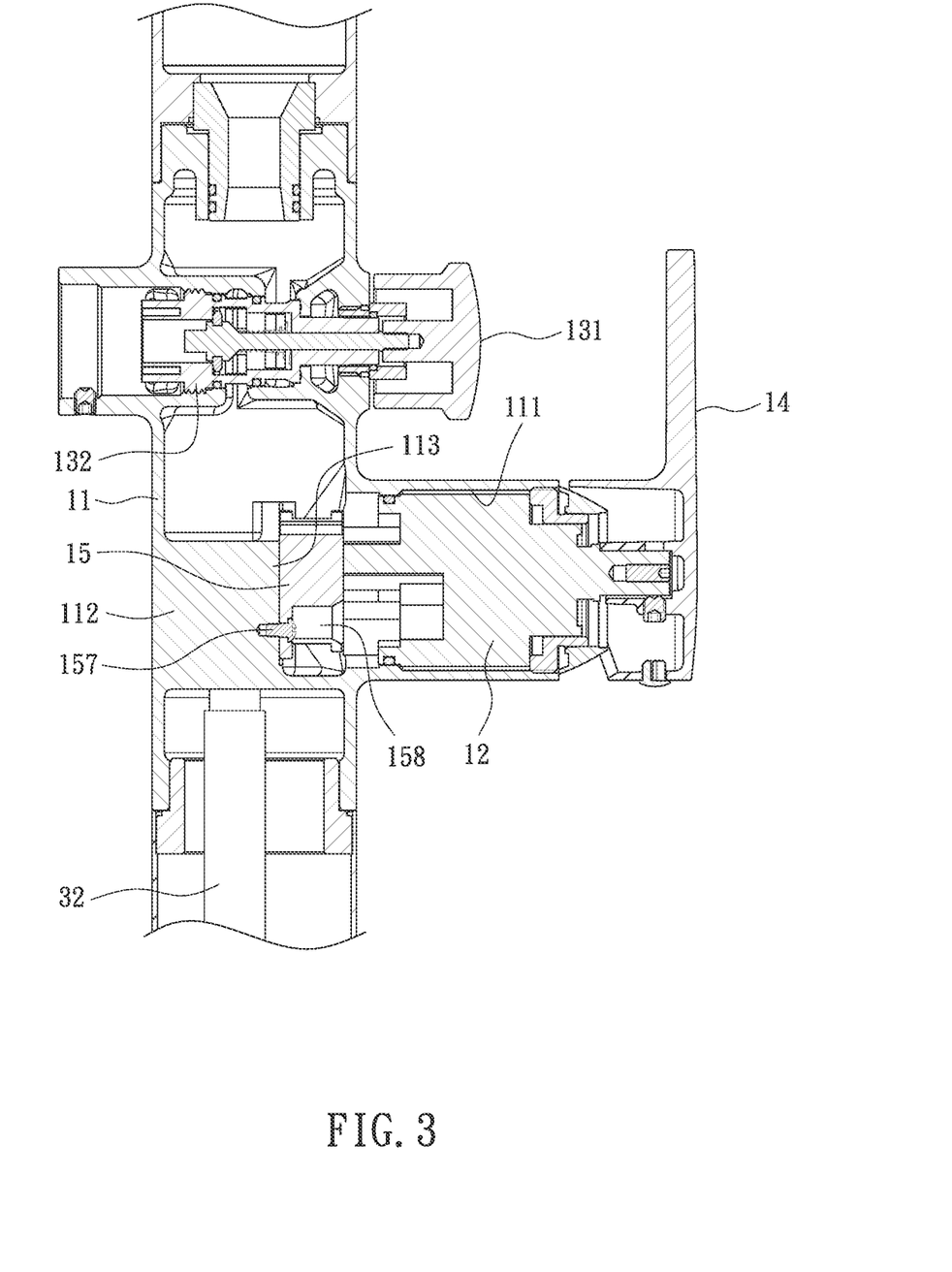
FIG. 3 is a partial longitudinal sectional view around a valve assembly of an embodiment according to the present invention.
Figure 4:
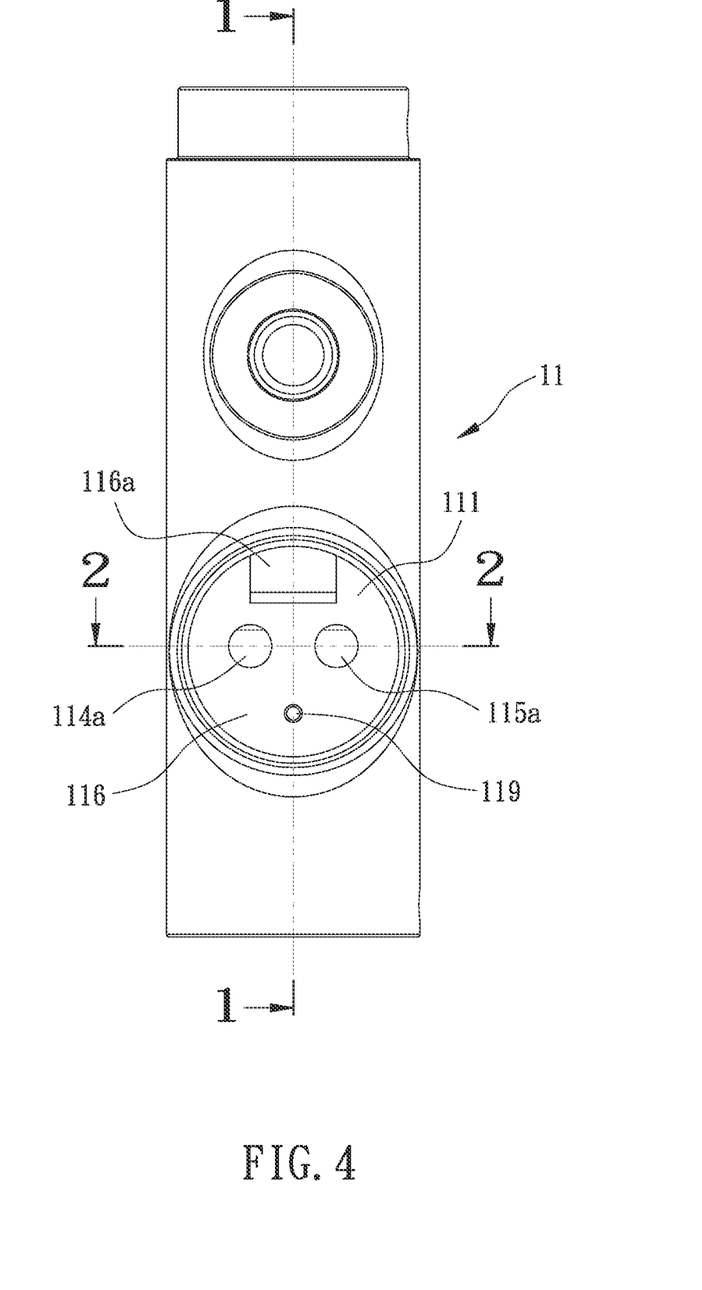
FIG. 4 is a right view of a housing of an embodiment according to the present invention.

Refer to FIG. 1, FIG. 2, and FIG. 3, a free-standing faucet 1 of the present invention is disposed and fixed on a floor around a tub for filling water into the tab. The free-standing faucet 1 mainly includes a valve assembly 10, a spout 20 connected to the valve assembly 10, an inlet tube set 30, a free-standing casing tube 40, a spray holder 50, and a spray 60. The valve assembly 10 consists of a housing 11, a mixing valve 12 located in the housing 11, a diverter 13 located in the housing 11, and a handle 14 used for operation and control of water flow and temperature. The spray holder 50 is connected to and communicating with the housing 11 for allowing water to flow through. The spray 60 is composed of a water hose 61 and a handheld spray head 62 which are respectively connected to and communicating with the spray holder 50 and the water hose 61. The inlet tube set 30 which includes a cold-water inlet tube 31 and a hot-water inlet tube 32 is mounted in the free-standing casing tube 40. As to the diverter 13, it is composed of an operation knob 131 disposed outside the housing 11 and a diverter valve 132 mounted inside the housing 11.

While users turn the handle 14 on, cold water and hot water respectively from the cold-water inlet tube 31 and the hot-water inlet tube 32 are mixed in the mixing valve 12 in a certain ratio to form mixed water. Under guidance of the diverter valve 132, the mixed water is flowing through the spout 20 upward to form a first water outflow which is mainly filled into the tub. At the moment, the user can switch flowing directions of the mixed water by pulling the operation knob 131 which actuates the diverter valve 132. Thus the mixed water is flowing toward the spray holder 50 under guidance of the diverter valve 132, passed through the water hose 61 of the spray 60, reached the handheld spray head 62 and then flowing out to form a second water outflow which is used for users to take a shower.

Refer to FIG. 3-6, the present free-standing faucet features on that the housing 11 is provided with a mixing valve chamber 111 in which the mixing valve 12 is mounted, a pipe joint 112 disposed on an inner side of the mixing valve chamber 111 horizontally and having a bottom connected to the inlet tube set 30, a connection portion 113 formed on one side of the pipe joint 112 close to the mixing valve chamber 111, a first cold water channel 114, and a first hot water channel 115. The first cold water channel 114 and the first hot water channel 115 are formed inside the pipe joint 112 and communicating with the inlet tube set 30 and the connection portion 113.

As shown in FIG. 7-12, the valve assembly 10 further includes an adapter 15 which is connected to the connection portion 113 inside the housing 11 and provided with a second cold water channel 151 and a second hot water channel 152 which are mounted in the adapter 15 and used for guiding cold water and hot water from the first cold water channel 114 and the first hot water channel 115 to a third cold water channel 121 and a third hot water channel 122 of the mixing valve 12 respectively.

Figure 5:
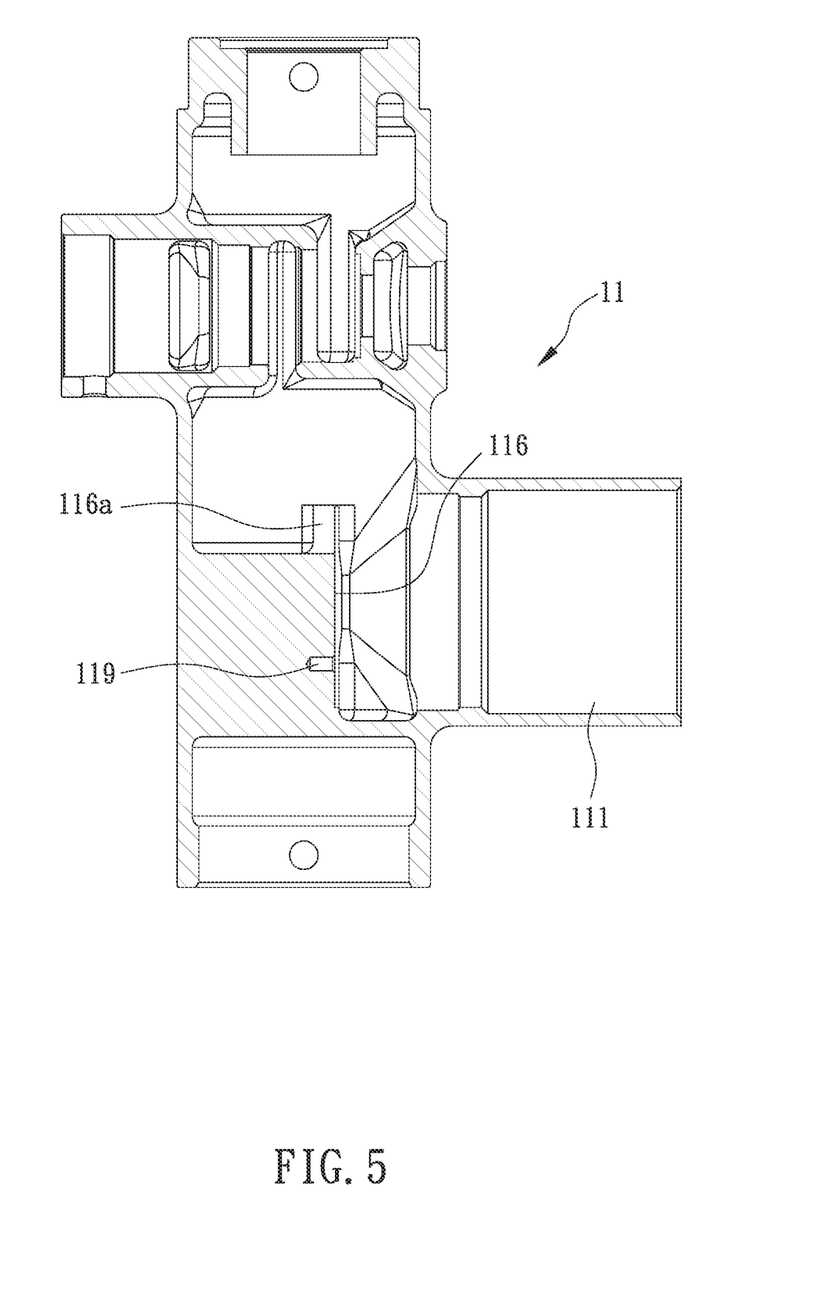
FIG. 5 is a sectional view along the line 1-1 in FIG. 4 according to the present invention.
Figure 6:
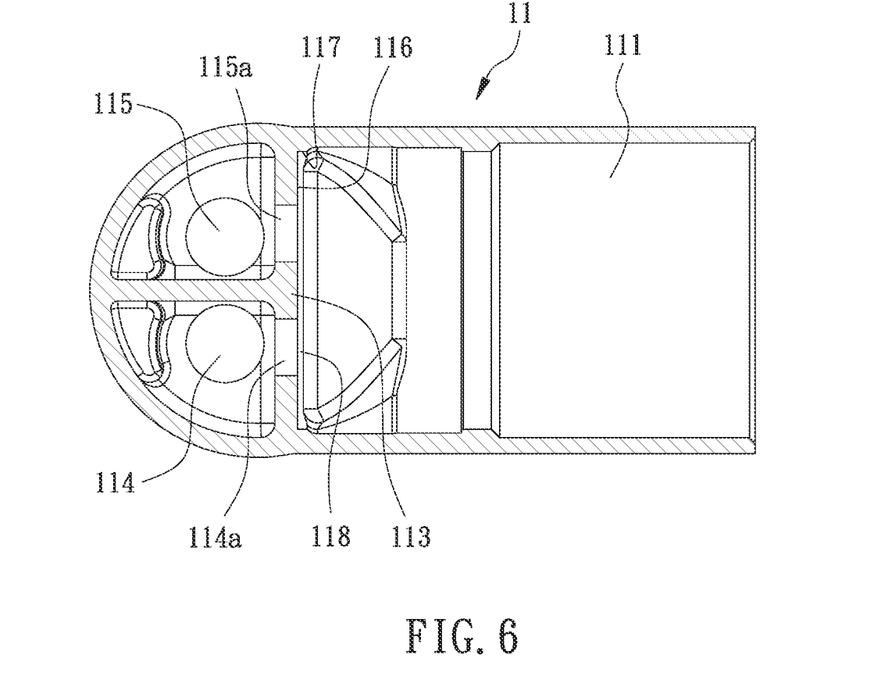
FIG. 6 is a sectional view along the line 2-2 in FIG. 4 according to the present invention.
Figure 7:
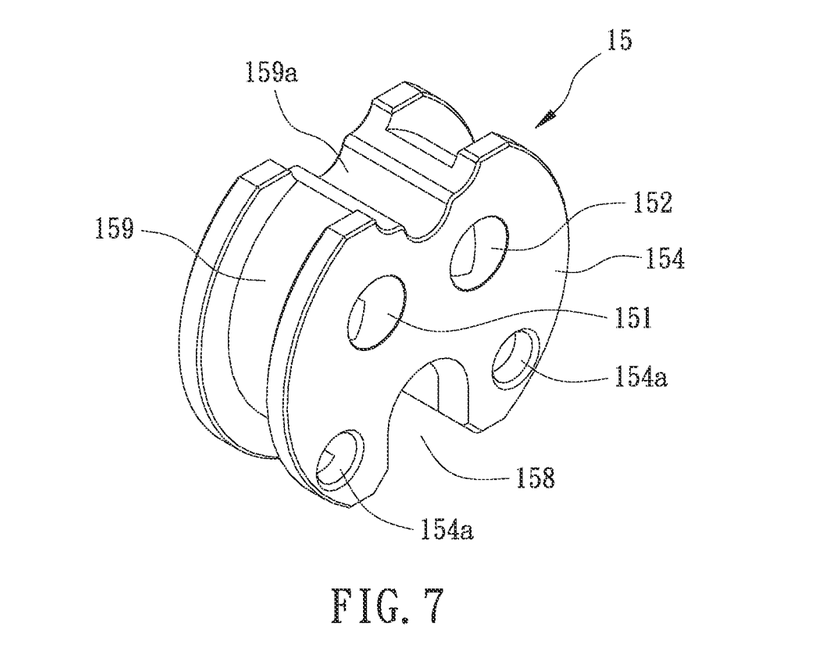
FIG. 7 is a perspective view of an adapter showing an outer side of the adapter according to the present invention.
Figure 9:
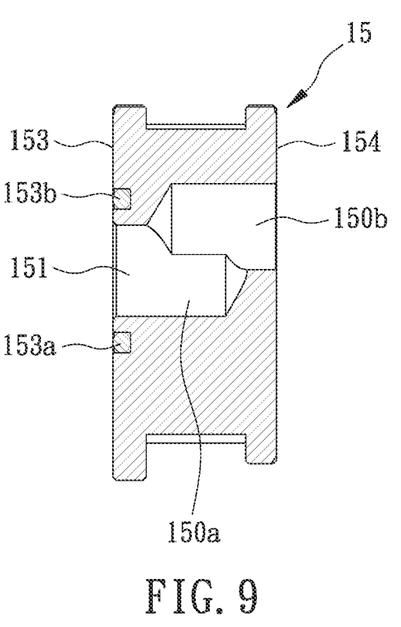
FIG. 9 is a sectional view along the line 3-3 in FIG. 8 according to the present invention.
Figure 10:
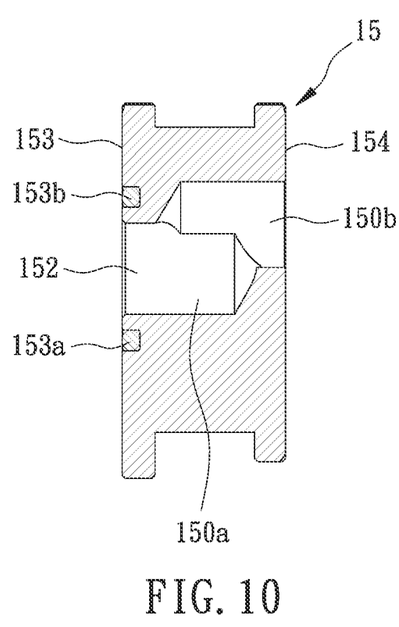
FIG. 10 is a sectional view along the line 4-4 in FIG. 8 according to the present invention.

Also refer to FIG. 6, a connection wall surface 116 and a circular limit wall 117 are disposed on the connection portion 113 of the pipe joint 112 and working together to define a mounting slot 118. The first cold water channel 114 and the first hot water channel 115 of the pipe joint 112 are respectively provided with a first cold water outlet 114a and a first hot water outlet 115a arranged at the connection wall surface 116. The adapter 15 is mounted and limited in the mounting slot 118 and further having an inner contact wall surface 153 and an outer contact wall surface 154 while the second cold water channel 151 and the second hot water channel 152 are located between the inner contact wall surface 153 and the outer contact wall surface 154, as shown in FIG. 7, FIG. 9 and FIG. 10. Also refer to FIG. 3, FIG. 5, and FIG. 12, the inner contact wall surface 153 is attached and connected to the connection wall surface 116 closely so that a second cold water inlet 151a formed on an inner side of the second cold water channel 151 and a second hot water inlet 152a formed on an inner side of the second hot water channel 152 are respectively aligned and communicating with the first cold water outlet 114a and the first hot water outlet 115a. The outer contact wall surface 154 is attached and connected to an inner wall surface of the mixing valve 12 closely so that a second cold water outlet 151b formed on an outer side of the second cold water channel 151 and a second hot water outlet 152b formed on an outer side of the second hot water channel 152 are respectively aligned and communicating with a third cold water inlet 121a formed on the third cold water channel 121 and a third hot water inlet 122a formed on the third hot water channel 122.

Figure 8:
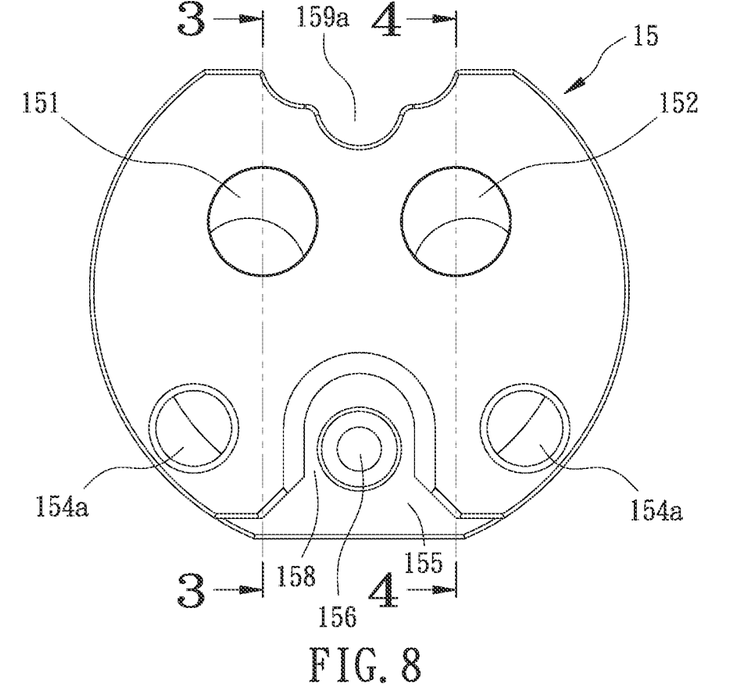
FIG. 8 is a side view of an outer side of an adapter according to the present invention.

In this embodiment, as shown in FIG. 3, FIG. 5, and FIG. 8, a threaded hole 119 is formed on the connection wall surface 116 of the pipe joint 112 while the adapter 15 is provided with a connection area 155 at which a through hole 156 is arranged. A fastening bolt 157 is inserted through the through hole 156 and then threaded and engaged with the threaded hole 119 so as to fix and connect the adapter 15 to the pipe joint 112.

Refer to FIG. 7 and FIG. 8, a notch 158 is formed on a lower part of the outer contact wall surface 154 while the connection area 155 is a thin plate arranged at an inner side of the notch 158. Thus the fastening bolt 157 used can be a shorter one in order to ensure that the fastening bolt 157 will not project from the outer contact wall surface 154. Therefore, the close attachment and connection between the outer contact wall surface 154 and the mixing valve 12 will not be affected.

As shown in FIG. 8, FIG. 9, and FIG. 10, both the second cold water channel 151 and the second hot water channel 152 of the adapter 15 are composed of an inner side hole 150a and an outer side hole 150b communicating and connected with each other in a staggered manner. Also refer to FIG. 12, the two inner side holes 150a are provided with the second cold water inlet 151a and the second hot water inlet 152a respectively while the two outer side holes 150b are provided with the second cold water outlet 151b and the second hot water outlet 152b respectively. The above design of the inner side hole 150a and an outer side hole 150b communicating and staggered with each other inside the second cold water channel 151 and the second hot water channel 152 of the adapter 15 ensures that the adapter 15 can be aligned and communicating with not only the first cold water outlet 114a and the first hot water outlet 115a of the pipe joint 112, but also the third cold water inlet 121a and the third hot water inlet 122a of the mixing valve 12. Thus the problem of the conventional mixing valve which is unable to be aligned and connected with the connecting seat (adapter) smoothly during assembly can be solved. Therefore, the design not only allows the assembly of the mixing valve 12 easy and secure, but also makes water communicate and flow therethrough smoothly. The water outflow meets users' needs.

Figure 11:
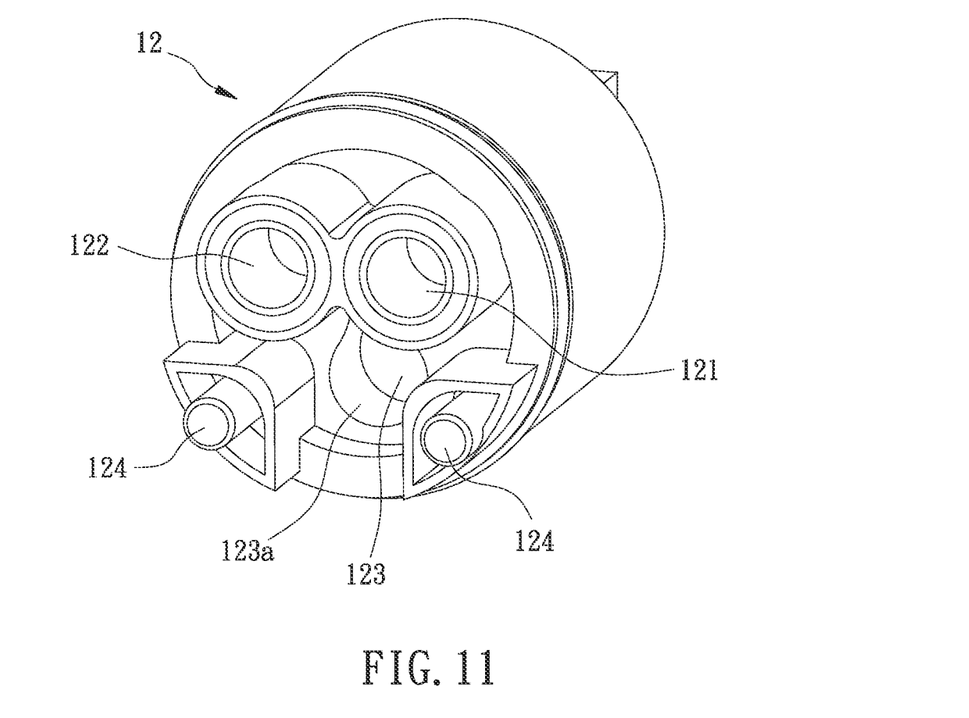
FIG. 11 is a perspective view of an inner side of a mixing valve of an embodiment according to the present invention.
Figure 12:
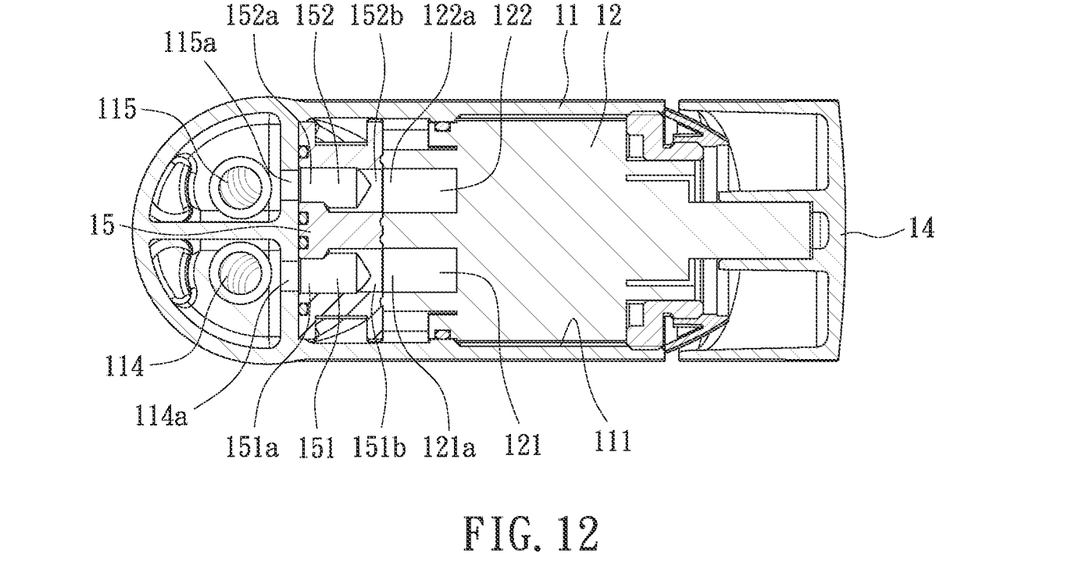
FIG. 12 is a cross sectional view around a valve assembly of an embodiment according to the present invention.
Figure 13:
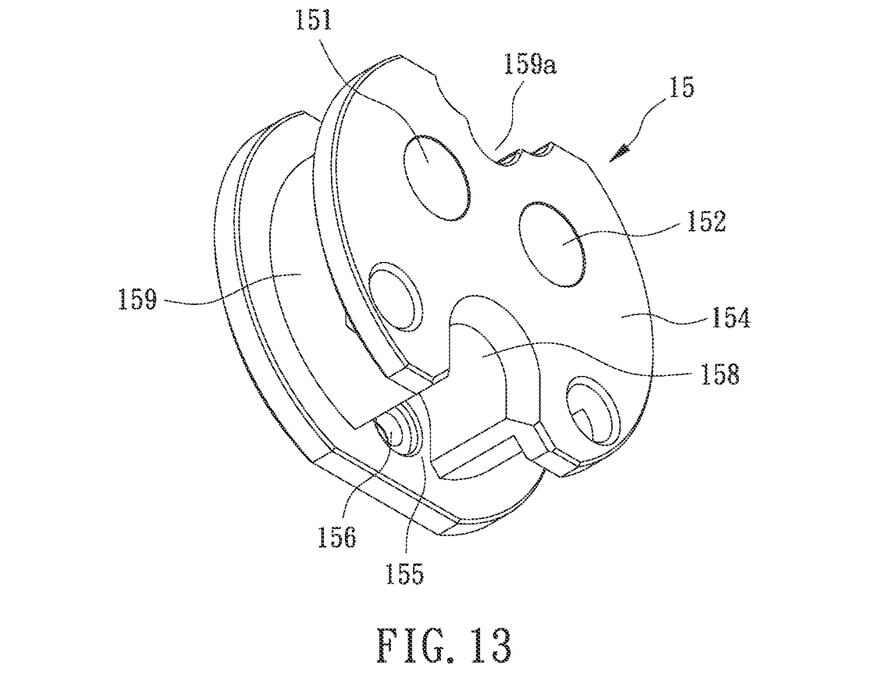
FIG. 13 is another perspective view of an adapter showing an outer side of the adapter according to the present invention.

As shown in FIG. 11, the mixing valve 12 is further provided with a mixed water channel 123 which allows mixed water formed by mixing of cold and hot water coming respectively from the third cold water channel 121 and the third hot water channel 122 in a certain ratio to flow out. A mixed water outlet 123a is formed on the mixed water channel 123, located at a lower part of the mixing valve 12, and communicating with the notch 158 of the adapter 15 correspondingly. As shown FIG. 4, FIG. 5, FIG. 7, and FIG. 13, the adapter 15 is further provided with a circular groove 159 which is communicating with the notch 158 and having a horizontal slot 159a on an upper part thereof. Also refer to FIG. 3, FIG. 4 and FIG. 5, a circulation opening 116a aligned with the horizontal slot 159a is formed on the connection wall surface 116 of the pipe joint 112 so that the horizontal slot 159a is communicating with the diverter valve 132. Thereby the mixed water from the mixing valve 12 is flowing through the notch 158, the circular groove 159, the circulation opening 116a and then toward the diverter valve 132 (as shown in FIG. 3). The notch 158, the circular groove 159, the horizontal slot 159a, and the circulation opening 116a enable a water flow guiding function.

Refer to FIG. 8 and FIG. 11, two positioning pins 124 are projecting from the inner wall surface of the mixing valve 12 while the outer contact wall surface 154 of the adapter 15 is provided with two positioning holes 154a corresponding to the positioning pins 124 for mounting and positioning the positioning pins 124 therein. Thereby quick and accurate assembly and positioning of the mixing valve 12 with the adapter 15 are attained.

Figure 14:
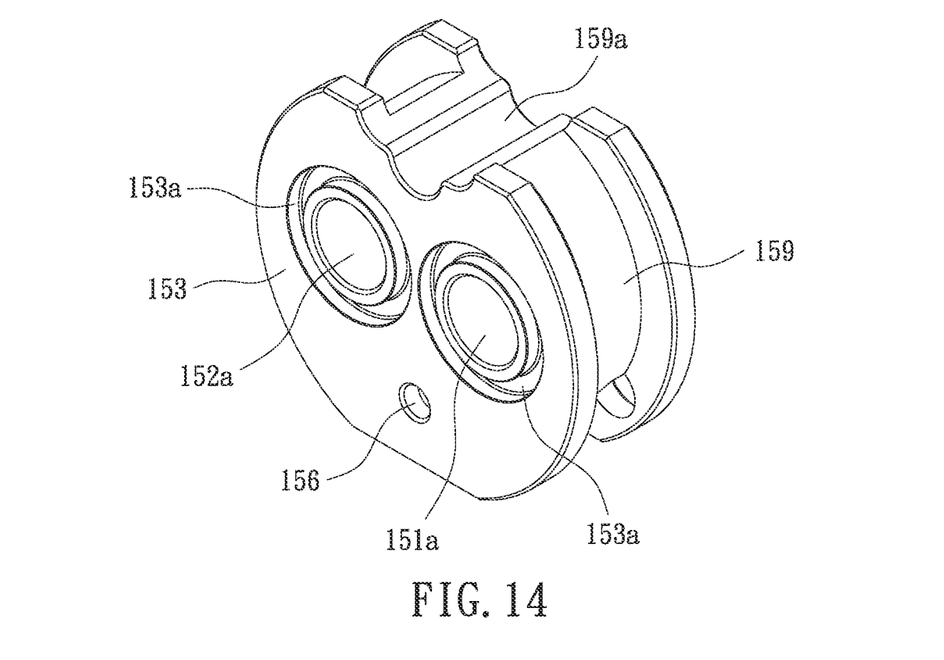
FIG. 14 is a perspective view of an adapter showing an inner side of the adapter according to the present invention.

Refer to FIG. 9, FIG. 10, and FIG. 14, the inner contact wall surface 153 of the adapter 15 is provided with two positioning circular slots 153a disposed around the second cold water inlet 151a and the second hot water inlet 152a respectively while a sealing gasket 153b is mounted in each of the positioning circular slots 153a and leaning against the connection wall surface 116 of the pipe joint 112 for providing excellent sealing and preventing leaks of water flow.

By the design of the pipe joint 112 and the adapter 15, water communicates between and flows through the mixing valve 12 and the pipe joint 112 smoothly due to the adapter 15 connected therebetween. The loss of the amount and dynamics of the water flow can be avoided and smoothness of the water flow is ensured so that water needs of users can be met. Moreover, not only the adapter 15 has simple structure, the assembly, positioning and connection among the pipe joint 112, the adapter 15 and the mixing valve 12 are also easy and secure. Therefore, the present device is easy and convenient to assembly and operate.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A free-standing faucet disposed and fixed on a floor comprising:
   a valve assembly, a spout connected to the valve assembly, an inlet tube set, and a free-standing casing tube, a spray holder, and a spray; the valve assembly having a housing, a mixing valve mounted in the housing, a diverter mounted in the housing, and a handle for operation and control of water flow and temperature; the spray holder is connected to and communicating with the housing for allowing water to pass through while the spray includes a water hose and a handheld spray head which are respectively connected to and communicating with the spray holder and the water hose; the inlet tube set which includes a cold-water inlet tube and a hot-water inlet tube is mounted in the free-standing casing tube;
   wherein the housing is provided with a mixing valve chamber in which the mixing valve is mounted, a pipe joint disposed on an inner side of the mixing valve chamber horizontally and having a bottom connected to the inlet tube set, a connection portion formed on one side of the pipe joint close to the mixing valve chamber, and a first cold water channel and a first hot water channel which are formed inside the pipe joint and communicating with the inlet tube set and the connection portion;
   wherein the valve assembly further includes an adapter; the adapter is connected to the connection portion inside the housing and provided with a second cold water channel and a second hot water channel which are formed in the adapter for guiding cold water and hot water from the first cold water channel and the first hot water channel to a third cold water channel and a third hot water channel of the mixing valve respectively; and
   wherein a connection wall surface and a circular limit wall are arranged at the connection portion of the pipe joint of the free-standing faucet and combined with each other to define a mounting slot; the first cold water channel and the first hot water channel of the pipe joint are respectively provided with a first cold water outlet and a first hot water outlet which are located at the connection wall surface; the adapter which is mounted and limited in the mounting slot is further provided with an inner contact wall surface and an outer contact wall surface while the second cold water channel and the second hot water channel are located between the inner contact wall surface and the outer contact wall surface; the inner contact wall surface is attached and connected to the connection wall surface closely so that a second cold water inlet formed on an inner side of the second cold water channel and a second hot water inlet formed on an inner side of the second hot water channel are respectively aligned and communicating with the first cold water outlet and the first hot water outlet; the outer contact wall surface is attached and connected to an inner wall surface of the mixing valve closely so that a second cold water outlet formed on an outer side of the second cold water channel and a second hot water outlet formed on an outer side of the second hot water channel are aligned and communicating with a third cold water inlet formed on the third cold water channel and a third hot water inlet formed on the third hot water channel respectively.

2. The free-standing faucet as claimed in claim 1, wherein a threaded hole is formed on the connection wall surface of the pipe joint and the adapter is provided with a connection area at which a through hole is arranged; a fastening bolt is inserted through the through hole and then engaged with the threaded hole so as to fix the adapter to the pipe joint.

3. The free-standing faucet as claimed in claim 2, wherein a notch is formed on a lower part of the outer contact wall surface and the connection area is a thin plate arranged at an inner side of the notch.

4. The free-standing faucet as claimed in claim 1, wherein both the second cold water channel and the second hot water channel of the adapter are composed of an inner side hole and an outer side hole communicating and connected with each other in a staggered manner; the two inner side holes are provided with the second cold water inlet and the second hot water inlet respectively while the two outer side holes are provided with the second cold water outlet and the second hot water outlet respectively.

5. The free-standing faucet as claimed in claim 3, wherein mixed water channel disposed on the mixing valve of the free-standing faucet for allowing the mixed water formed by mixing of cold and hot water coming respectively from the third cold water channel and the third hot water channel in a certain ratio to flow out, A mixed water outlet is formed on the mixed water channel, located at a lower part of the mixing valve, and communicating with the notch of the adapter, The adapter is further provided with a circular groove which is communicating with the notch and having a horizontal slot on an upper part thereof while a circulation opening aligned with the horizontal slot is formed on the connection wall surface of the pipe joint so that the horizontal slot is communicating with the diverter.

6. The free-standing faucet as claimed in claim 1, wherein two positioning pins are projecting from the inner wall surface of the mixing valve and the outer contact wall surface of the adapter is provided with two positioning holes corresponding to the positioning pins for mounting and positioning the positioning pins therein.

7. The free-standing faucet as claimed in claim 1, wherein the inner contact wall surface of the adapter of the free-standing faucet is provided with two positioning circular slots arranged around the second cold water inlet and the second hot water inlet respectively while a sealing gasket is mounted in each of the positioning circular slots and leaning against the connection wall surface of the pipe joint.

* * * * *